United States Patent Office 3,101,530
Patented Aug. 27, 1963

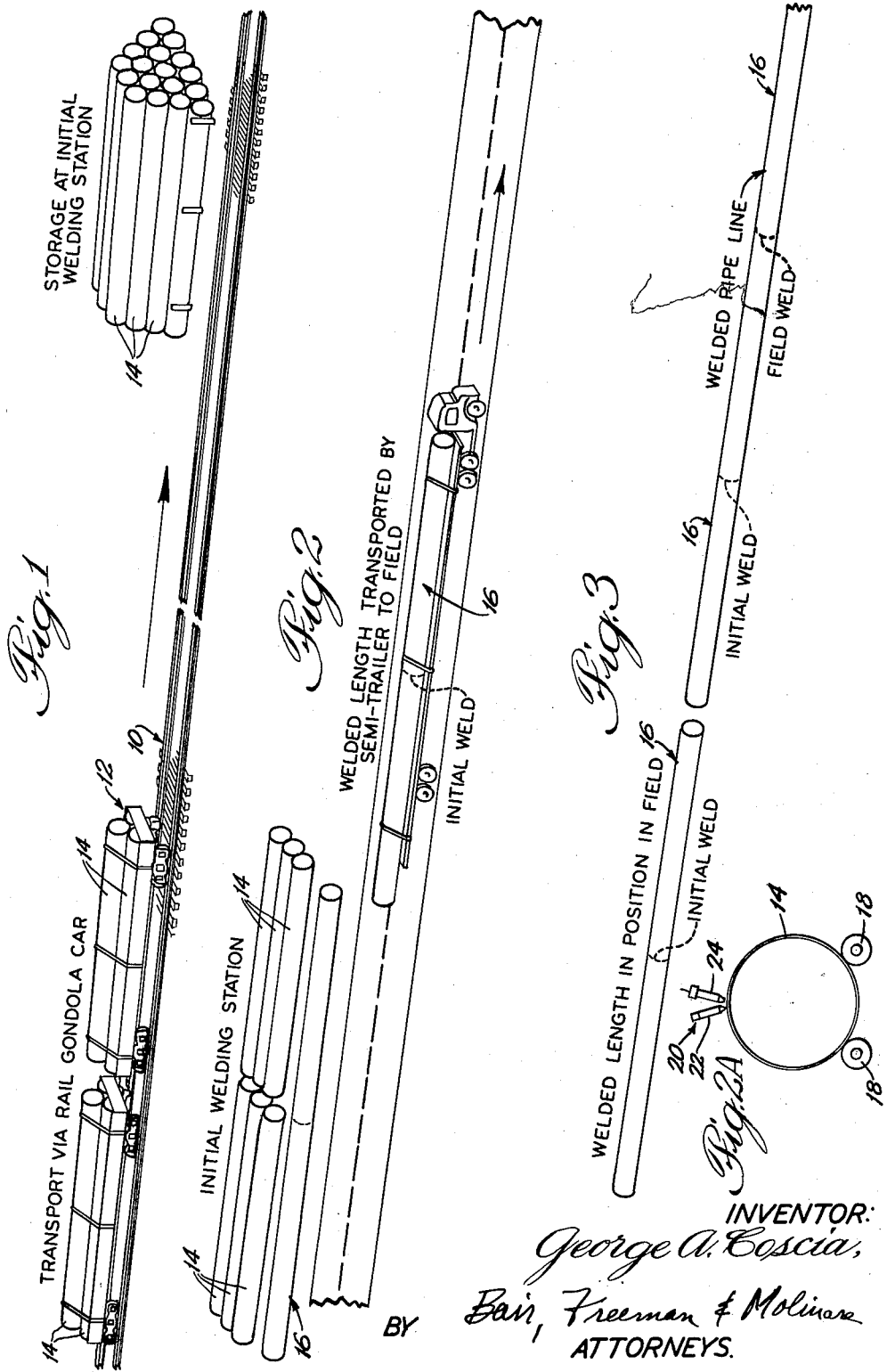

3,101,530
METHOD OF FABRICATING ELONGATED
UNDERGROUND CONDUITS
George A. Coscia, Eggertsville, N.Y.
Filed Aug. 29, 1960, Ser. No. 52,540
4 Claims. (Cl. 29—469)

This invention relates to a method of fabricating elongated underground conduits.

Underground conduits for transporting large amounts of fluids, gases or liquids, over considerable distances have always represented a major economic investment. This is particularly true in an economy that utilizes high-cost labor as presently exists in the United States.

In the production of such underground conduits, the cost of the conduit segments is substantially pegged by the competitive prices of the various suppliers of such materials, and very little savings may be effected in this item of cost even by the most judicious purchasing. The other major item of cost in the production of an underground conduit is the labor involved in assembling the conduit and burying the conduit. As to the cost of digging the trench and burying the conduit, again, the utilization of trench digging machines and unskilled labor fairly effectively pegs that item of cost as a function of the productivity of the machine. Thus, the only area in which labor costs may be reduced by ingenious operations is in the assembly of the conduit.

Heretofore, in the assembly of the conduit, the conduit segments from the supplier have been delivered to the site of the conduit fabrication and there each segment is connected end to end. Where steel conduits are installed, the end-to-end connections require the services of an experienced welder to crawl along the periphery of the conduit to form a weld bead around the entire periphery of each pipe section at each end. Since the conduit is to carry fluids under pressure, the welding must be very meticulous to avoid any leaks. Since conduits may be of sizes between 36 inches and 108 inches diameter, the time that a high-priced welder must spend on each seam, or joint, is considerable and may easily extend to four or more hours per seam.

Thus, it is an object of this invention to provide an improved and more economical method of fabricating conduits.

Another object of this invention is to provide a novel combination of steps in handling conduit segments so as to materially reduce the amount of on-site welding required to produce a conduit.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which:

FIGURE 1 illustrates the delivery of conduit segments by rail to an off-site location;

FIGURE 2 illustrates the connecting of the short conduit segments that have been delivered by rail to form conduit segments of intermediate length adapted to be transported by motor vehicle;

FIGURE 2A illustrates a preferred method of effecting the off-site welding of the short conduit segments to form the conduit segments of intermediate length; and FIGURE 3 illustrates generally the connection of conduit segments of intermediate length to define the conduit at the site in the field.

Referring now to the drawings, FIGURE 1 illustrates the preferred manner of delivery of steel conduit segments to an off-site location. There is shown a spur track 10, or the like, upon which are positioned gondola cars 12 each carrying a plurality of relatively short steel conduit segments 14 that are appropriately secured in position on the gondola cars 12. Because of the length of standard gondola cars 12, the length of the conduit segments 14 that are now deliverable by gondola cars is set at a maximum of 40 feet. At the right-hand end of FIGURE 1 there is illustrated a typical storage of the plurality of short, 40-foot conduit segments, at an off-site location.

In the past, the segments 14, after being unloaded from the rail carrier, would be transported to an on-site location where each segment 14 would be welded by a manual operation to the end of a previous segment 14, thereby forming the underground conduit. Now, in the instant development, the hand-welding operations that previously were performed in the field at the site are partly reduced by welding together two 40-foot conduit segments 14 to define a conduit segment 16 that is 80 feet long and may be referred to as a segment of intermediate length.

FIGURE 2 illustrates such an 80-foot conduit segment of intermediate length, and it will be understood that such conduit segments that are 80 feet long may be loaded on motor vehicles, such as truck-drawn semi-trailers, as is illustrated in FIGURE 2, and may be delivered to the site where the intermediate segments 16 are to be connected together to define the underground conduit. FIGURE 3 illustrates a plurality of successive segments 16 that are being welded together in the field to define the conduit.

In the production of the intermediate length conduit segments 16 it is preferred that the welding operation be at an off-site location and be one that may be performed automatically by machine, as contrasted to the manual welding that is presently utilized at an on-site location. There presently exist machines which provide roller-type beds onto which a pair of pipe segments 14 may be loaded, and such machines have welding means, or heads, which operate first to deposit a flux into the joint between the adjacent edges of the two segments 14, and a welding instrument then delivers the weld metal into the joint between the two segments as the pair of segments 14 are rotated about the longitudinal axis. In other words, the open joint between two adjacent conduit segments 14 is rotated past a stationary welding station which automatically deposits flux into the open joint between the adjacent edges of segments 14 and then applies the weld metal into said joint. Such a machine is generally illustrated by FIGURE 2A, wherein the supporting and rotating roller means are indicated at 18 and the welding means are indicated at 20. The welding means 20 includes a flux-depositing means 22 and a weld-metal depositing means 24. Alternatively, the welding means 20 could be of the type which does not require flux and which utilizes carbon dioxide shielding gas, such a system being available from Air Reduction Company.

Machines of the foregoing type for automatically welding together conduit segments are in existence and have been utilized in steel mills or the like. Since such machines are fairly large and heavy, they require a relatively permanent installation, and such permanent installation may be conveniently and economically provided only at a relatively permanent off-site location and could not be conveniently or economically provided at an on-site location in the field.

The provision of 80-foot intermediate conduit segments 16 prevents the transport of said segments by rail, but there exists motor vehicles, such as truck-drawn semi-trailers which are able to transport 80-foot segments to an on-site location. Hence the development herein contemplates the delivery of standard, short, 40-foot conduit segments by rail to an off-site location at which the short segments are machine-welded together to define intermediate length segments whose lengths are integer multiples of the length of the short conduit segments. In the present disclosure, the intermediate segment is twice the length of the short segments. The intermediate conduit segments are then delivered by motor vehicle, such as truck-drawn trailer, to an on-site location, where the intermediate length conduit segments are then joined together by standard manual welding procedures.

The foregoing procedure eliminates half of the manual welding operations heretofore performed, although there is substituted one machine-performed welding operation. However, a machine-performed welding operation may be effected in a very short period of time, of a few minutes, and at much less cost than is called for by the manual-welding operation.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States, is:

1. A method of economically fabricating an elongated steel conduit of a size in the range of at least 36 inches in diameter comprising, in combination, the step of: providing a plurality of relatively short conduit segments of a length adapted to be transported by rail; delivering the short conduit segments by rail to an off-site location; automatically welding together a plurality of said conduit segments, while maintaining said segments substantially horizontally, at an off-site location into unitary, non-separable, intermediate conduit segments whose lengths are integer multiples of the length of said short conduit segments, and which intermediate conduit segments are adapted to be transported by motor vehicle; delivering the intermediate conduit segments by motor vehicle to the site where the conduit is to be assembled; placing said intermediate conduit segments in end-to-end axially aligned relationship at their position of use; and then manually welding together the intermediate conduit segments, at the site, to define the elongated conduit.

2. A method of economically fabricating an elongated steel conduit of a size in the range of at least 36 inches in diameter comprising, in combination, the steps of: providing a plurality of conduit segments of 40-foot length; transporting said 40-foot segments by rail to an off-site location; automatically welding together pairs of said 40-foot segments, while maintaining said segments substantially horizontally, at the off-site location to produce unitary, non-separable, intermediate conduit segments of 80-foot length; transporting said 80-foot segments by motor vehicle to the site where the conduit is to be assembled; placing said intermediate conduit segments in end-to-end axially aligned relationship at their position of use; and then manually welding together the 80-foot conduit segments, at the site, to define the elongated conduit.

3. A method of economically fabricating an elongated steel conduit of a size in the range of at least 36 inches in diameter comprising, in combination, the steps of: providing a plurality of conduit segments of 40-foot length; transporting said 40-foot segments by rail to an off-site location; automatically welding together pairs of said 40-foot segments, while maintaining said segments substantially horizontally, at the off-site location in a process in accordance with which the said 40-foot segments are rotated about their longitudinal axis while being welded together to produce unitary, non-separable, intermediate conduit segments of 80-foot length; transporting said 80-foot segments by motor vehicle to the site where the conduit is to be assembled; placing said intermediate conduit segments in end-to-end axially aligned relationship at their position of use; and then manually welding together the 80-foot conduit segments, at the site, to define the elongated conduit.

4. A method of economically fabricating an elongated steel conduit of a size in the range of at least 36 inches in diameter comprising, in combination, the steps of: providing a plurality of conduit segments of 40-foot length; transporting said 40-foot segments by rail to an off-site location; automatically welding together pairs of said 40-foot segments, while maintaining said segments substantially horizontally, at the off-site location in a process in accordance with which the said 40-foot segments are rotated about their longitudinal axis while being welded together to produce unitary, non-separable, intermediate conduit segments of 80-foot length; transporting said 80-foot segments by motor vehicle to the site where the conduit is to be assembled; placing said intermediate conduit segments in end-to-end axially aligned relationship at their position of use; and then manually welding together the 80-foot conduit segments to define the elongated conduit, in a process at the site in accordance with which the welding is effected by moving peripherally of the conduit segments while the conduit segments are maintained substantially stationary.

References Cited in the file of this patent

UNITED STATES PATENTS

| | | |
|---|---|---|
| 1,907,702 | Anderson | May 9, 1933 |
| 2,463,907 | Risley et al. | Mar. 8, 1949 |
| 2,876,717 | Tetyak | Mar. 10, 1959 |